Patented Mar. 8, 1949

2,463,994

UNITED STATES PATENT OFFICE 2,463,994

PROCESS FOR MAKING AGGREGATES

Ernest H. Nichols and Romayne M. Beyard, Hagerstown, Md., assignors to The Funkhouser Company, Hagerstown, Md., a corporation of Maryland No Drawing. Application August 25, 1944, Serial No. 551,270

8 Claims. (Cl. 25—158)

This invention relates to the manufacture of a strong light weight aggregate for mixing with cement or other suitable bonding materials. More particularly it relates to a process of nodulizing finely divided slate commonly known as slate dust and burning the nodules to produce vesiculated pellets having a hard outer shell impervious to water.

It is an object of the invention to nodulize finely divided slate by subjecting the slate dust to the action of a rotary mixer and introducing into the mixer a mixture which serves to bond the slate fines together to form nodules which when dried have an outer shell sufficiently hard to resist disintegration when passed through a rotary kiln during the burning process.

A further object of the invention resides in employing fuel oil as the temporary bonding agent for the slate fines which also acts to rapidly heat the nodules during the expansion of the slate fines thus softening the outer shell of the nodules so the gases evolved within the nodules may expand without rupturing their outer shells.

A still further object of the invention resides in the use of sulfite liquor in admixture with the fuel oil which serves to form a hard shell on the nodules when dried and in addition supplies a fluxing agent on the surface of the nodules during the burning process which promotes fusion of the coating on the nodules.

Another object of the invention resides in blowing silica fines into the discharge end of the kiln, which is the hottest zone, to prevent agglomeration of the nodules during the burning process and to form an irregular surface on the pellets which promotes better bonding of the pellets with the cement materials.

Other objects and advantages of the invention will be apparent during the course of the following description.

In carrying out the process the finely divided slate, commonly known as slate dust, all of which will pass a 35 mesh screen is placed in a suitable mixer such as a trommel or concrete mixer. A mixture of waste sulfite liquor and fuel oil is sprayed into the mixer while the latter is rotating. The spray is directed to impinge against the blades of the mixer effecting an agglomeration of the slate fines to form nodules of various sizes. After the nodules are formed they are removed from the mixer and dried. The fuel oil serves as a binder to hold the slate fines in agglomerated form while the sulfite liquor migrates to the surface of the nodules when dried to form a hard outer shell sufficiently tough to resist the disintegrating action to which the nodules are subjected when passing through a rotary kiln. It has been found the waste sulfite liquor and fuel oil provide a highly satisfactory mixture for nodulizing the slate fines but if desired silicate of soda or sodium carbonate may be substituted for the sulfite liquor and molasses or a drying oil may be substituted for the fuel oil.

An analysis of the waste sulfite liquor used shows it contains ash, organic acids, sugars, sodium sulfite, sulfur, calcium oxide and magnesium oxide. Of these materials the organic acids, sugars, sulphur and to a small extent sodium sulfite furnish gas producing materials when heated to a high temperature. The ash, sodium sulfite, calcium oxide and magnesium oxide are materials which produce fusion. The sulfite liquor as well as the fuel oil helps to bind the slate fines together to form the nodules.

When the nodules are dry they are ready to be passed through a rotary kiln having the burner located adjacent the discharge end of the kiln. The kiln is heated to a temperature ranging between 1800° F. and 2600° F. with the hottest zone at the discharge end of the kiln. Before introducing the nodules into the kiln they are screened to the desired sizes, the undersized ones being returned to the mixer for enlargement to the desired size. As the nodules pass through the kiln they are rapidly heated which softens the outer shell and causes the gases evolved within the nodules to expand the slate fines forming a cellular structure without rupturing the outer shell which expands with the body. To prevent agglomeration of the nodules during the burning process silica fines or clay fines are blown into the discharge end of the kiln. The silica fines become fused to the coating of the nodules and in addition to preventing their agglomeration form an irregular surface with sharp protuberances. The burned nodules when discharged from the kiln are in the form of pellets of substantially spherical shape and cool very rapidly because of their high surface area to weight ratio. The pellets have a hard shell impervious to water with sharp protuberances on the surface which promotes bonding of the pellets with the cement or other suitable bonding material such as, magnesium oxychloride, asphalt or rubber.

The body of the nodules being formed of numerous slate fines arranged at various angles with respect to each other, it will be seen that when the nodules are burned the slate fines expand in various directions forming a pellet having a strong cellular structure which has great compression strength. The sulfite liquor has the characteristics of migrating to the surface of the nodules when the latter are dried and forms an initial coating which when burned in the presence of silica fines applied to the coating forms a hard tough coating for the finished pellets which will withstand considerable pressure before breaking. In addition the coating is impervious to water or the bonding materials with which the pellets are admixed.

Having thus described our invention, we claim:

1. A method of making a light weight vesicular aggregate comprising agglomerating slate fines in angular relation to each other to form nodules and heating the nodules at a temperature to cause expansion of the individual slate fines to produce a cellular structure.

2. A method of making a light weight vesicular aggregate comprising mixing slate fines with a binder to form nodules in which the fines are arranged in angular relation to each other and heating the nodules at a temperature to cause expansion of the individual slate fines to produce a cellular structure.

3. A method of making a light weight vesicular aggregate comprising mixing slate fines with a binder and coating material to form nodules in which the fines are arranged in angular relation to each other and heating the nodules at a temperature to cause expansion of the individual slate fines to produce a cellular structure.

4. A method of making a light weight vesicular aggregate comprising mixing slate fines with a binder and coating material to form nodules in which the fines are arranged in angular relation with respect to each other, drying the nodules whereby the coating material forms an outer protective shell for the fines and heating the nodules while agitating at a temperature to cause expansion of the individual slate fines to produce a cellular structure.

5. A method of making a light weight vesicular aggregate comprising mixing slate fines with a binder and coating material to form nodules in which the fines are arranged in angular relation to each other, drying the nodules whereby the coating material forms an outer protective shell enclosing the fines, and heating the nodules while agitating in the presence of silica fines at a temperature to cause expansion of the individual slate fines to produce a cellular body having a non-porous coating.

6. A method of making a light weight vesicular aggregate comprising mixing slate fines with fuel oil and sulfite liquor to form nodules in which the fines are arranged in angular relation to each other, drying the nodules whereby the sulfite liquor forms a protective shell enclosing the fines, and heating the nodules while agitating in the presence of silica fines at a temperature to cause expansion of the individual fines to produce a cellular body having a hard non-porous coating.

7. A light weight vesiculated aggregate comprising an agglomeration of angularly arranged individually expanded slate particles.

8. A light weight vesiculated aggregate comprising an agglomeration of angularly arranged individually expanded slate particles and a non-porous coating encasing said particles.

ERNEST H. NICHOLS.
ROMAYNE M. BEYARD.

REFERENCES CITED

The following references are of record in the file of this patent:

UNITED STATES PATENTS

| Number | Name | Date |
|---|---|---|
| 451,818 | Gregg | May 5, 1891 |
| 930,801 | Senn | Aug. 10, 1909 |
| 1,390,435 | Gerlach et al. | Sept. 13, 1921 |
| 1,786,714 | Greenawalt | Dec. 30, 1930 |
| 2,024,176 | Lloyd | Dec. 17, 1935 |
| 2,035,845 | Stanton | Mar. 31, 1936 |
| 2,347,535 | Bair | Apr. 25, 1944 |

OTHER REFERENCES

An Encyclopaedia of the Ceramic Industries—by Searle, volume II. (Copy in Division 33.)

An Encyclopaedia of the Ceramic Industries—by Searle, volume III. (Copy in Division 33.)